(12) United States Patent
Konrad

(10) Patent No.: US 11,353,551 B2
(45) Date of Patent: Jun. 7, 2022

(54) SIMULATION DEVICE FOR MONITORING A MOTOR VEHICLE

(71) Applicant: KONRAD GMBH, Radolfzell (DE)

(72) Inventor: Michael Konrad, Radolfzell (DE)

(73) Assignee: Konrad GmbH, Radolfzell (DE)

( * ) Notice: Subject to any disclaimer, the term of this patent is extended or adjusted under 35 U.S.C. 154(b) by 219 days.

(21) Appl. No.: 16/613,874

(22) PCT Filed: May 18, 2018

(86) PCT No.: PCT/EP2018/063039
§ 371 (c)(1),
(2) Date: Nov. 15, 2019

(87) PCT Pub. No.: WO2018/211056
PCT Pub. Date: Nov. 22, 2018

(65) Prior Publication Data
US 2020/0103496 A1     Apr. 2, 2020

(30) Foreign Application Priority Data

May 18, 2017  (DE) .................. 10 2017 110 908.0
May 16, 2018  (DE) .................. 10 2018 111 709.4

(51) Int. Cl.
| | | |
|---|---|---|
| *G01S 7/40* | (2006.01) | |
| *G01S 7/497* | (2006.01) | |
| *G01S 13/86* | (2006.01) | |
| *G01S 13/931* | (2020.01) | |
| *G01S 13/00* | (2006.01) | |

(52) U.S. Cl.
CPC .............. *G01S 7/4052* (2013.01); *G01S 7/497* (2013.01); *G01S 13/865* (2013.01); *G01S 13/867* (2013.01); *G01S 13/931* (2013.01); *G01S 7/4082* (2021.05)

(58) Field of Classification Search
CPC ........................................................ G09B 9/40
See application file for complete search history.

(56) References Cited

U.S. PATENT DOCUMENTS 5,457,463 A *  10/1995  Vencel .............. G09B 9/40
                                                        342/169
8,242,948 B1 *  8/2012  Burky ............... G09B 9/54
                                                        342/25 R (Continued)

FOREIGN PATENT DOCUMENTS

DE    102014217524 A1    3/2016
DE    102014118625 A1    6/2016

OTHER PUBLICATIONS

International preliminary report on patentability for application No. PCT/EP2018/063039 dated Nov. 19, 2019.

(Continued)

*Primary Examiner* — Bernarr E Gregory
(74) *Attorney, Agent, or Firm* — Bachman & LaPointe, PC

(57) ABSTRACT

The disclosure relates to a simulation device for motor vehicle monitoring, wherein a radar sensor (2) and a camera sensor (3) and a LiDAR light receiving sensor (1) and a computer (4) are present, wherein the radar sensor (2) can be controlled via a radar signal transmitter, and the camera sensor (3) can be controlled via a lens, and the LiDAR light receiving sensor (1) can be controlled via a light transmitter.

7 Claims, 4 Drawing Sheets

(56) References Cited

U.S. PATENT DOCUMENTS

| | | | |
|---|---|---|---|
| 8,368,876 B1 | 2/2013 | Johnson et al. | |
| 9,575,161 B1 | 2/2017 | Haghighi et al. | |
| 10,520,586 B2* | 12/2019 | Haghighi | G01S 7/4052 |
| 2014/0036084 A1 | 2/2014 | Lu | |
| 2014/0070981 A1* | 3/2014 | Kim | G01S 7/4052 |
| | | | 342/171 |
| 2019/0065933 A1* | 2/2019 | Bogdoll | G06F 30/20 |

OTHER PUBLICATIONS

International search report for patent application No. PCT/EP2018/063039 dated Oct. 26, 2018.

\* cited by examiner

SIMULATION DEVICE FOR MONITORING A MOTOR VEHICLE

BACKGROUND OF THE INVENTION

The invention concerns a simulation device for a motor vehicle monitoring system and a procedure related to same.

It is known from the state of the art that camera sensors, radar sensors and LiDAR light measuring systems are known and used in the context of motor vehicle surveillance.

In this context, reference is made to DE 10 2014 217 524 A1. There is a test device for testing the safety hoisting equipment of a motor vehicle, whereby the test device comprises a test unit which can be positioned in an area surrounding a motor vehicle to be tested. Furthermore, the test unit has at least one test means for testing a safety-related device of a motor vehicle with at least one data processing means.

Reference is also made to US 2014/0036084 A1. There a lens arrangement in a motor vehicle is revealed, whereby the lens detects the distance of the detected objects in the range of the visibility of the lens and transmits it to a computer.

These sensors are used to monitor the vehicle's surroundings, particularly in the area of autonomous driving. In addition to autonomous driving, so-called driver assistance systems are also decisively dependent on these sensors in order to be able to operate accident-free.

Extensive work is required to check the quality and function of the sensors used. For example, larger three-dimensional scenarios with people and objects are simulated so that the sensors can be tested accordingly. These superstructures are time-consuming and costly.

LiDAR (abbreviation for Light detection and ranging) light measuring systems are used in addition to other applications for optical distance and speed measurement. LiDAR light measurement systems emit light and measure the propagation time during which the light returns to the LiDAR light measurement system after being reflected by an object. The distance between the object and the LiDAR light measurement system is determined by the known speed of the light. Depending on the design of a LiDAR light measurement system, distance measurements in the range from a few centimetres to several hundred thousand kilometres are possible.

Important areas of application for LiDAR light measurement systems have a measuring range from about 1 m to a few 100 m. Examples of these areas of application are mobile instruments for optical distance measurement and LiDAR light measurement systems for automotive applications, namely driver assistance systems and autonomous driving.

For testing LiDAR light measurement systems, for example in industrial quality control, a method is required to perform measurements at defined distances. In the simplest case, measurement distances of these defined lengths are required. Quality control also requires defined environmental conditions, such as temperature, humidity and ambient light along the measuring path, as well as defined optical properties of the measured object. Compliance with the environmental conditions places considerable demands on the space required for measuring sections. Test sections for distances of more than 10 m are therefore complex to implement.

If the LiDAR light measuring system is equipped with several channels which, like a conventional camera, take an image with an angle of aperture, the space requirement increases in comparison to the linear distance measuring system. For a LiDAR light-receiving sensor with a horizontal aperture angle of 360°, a vertical aperture angle of 45° and a maximum measuring distance of 100 m, a measuring station with a diameter of 200 m and a height of 83 m is required.

In addition to the simple testing of LiDAR light measurement systems at fixed distances, the requirement for a test system is to provide a moving scenery. This is particularly necessary in order to test LiDAR sensors during application development. For example, in order to test the behavior of LiDAR light measurement systems in autonomous driving applications, trips must be carried out and sensor data recorded. In this case, however, only this scenery of the drive can be tested.

SUMMARY OF THE INVENTION

The task of this invention is to overcome the disadvantages arising from the state of the art. In particular, a simulation device is to be provided which can quickly and easily control all the different sensors used in a simulation device under realistic conditions.

The characteristics disclosed herein lead to the solution of the problem.

Advantageous designs are described herein and in the subclaims.

The invention makes it possible to present any moving scenery to the LiDAR light measuring system. Instead of the time-delayed light signal returning from the object to be measured to the sensor during a measuring section, the time-delayed light signal is generated via an adjustable delay section.

The light signal emitted by the LiDAR light measuring system is detected by a photodetector and further propagation is blocked, for example by a light trap. The time of detection of the light signal emitted by the LiDAR light measurement system is used as the trigger time for generating the time-delayed signal.

A time-delayed signal with reference to the trigger is generated. In the invention, the time delay can be arbitrarily set and changed on the basis of a minimum delay caused by the electronics. The time-delayed signal is generated using an electronic time delay unit. The time delay is also changed electronically and is preferably in a range of >10 s−1. The time-delayed signal is used to generate a light signal using a suitable fast amplifier.

The signal regularly represents a light signal. The light signal is preferably generated by an LED or a laser diode. The LED comprises an LED driver. The laser diode in turn comprises a laser diode driver. A laser diode (also called a semiconductor laser) is a semiconductor component related to the light emitting diode (LED), but which generates laser radiation. Laser diodes operate a p-n junction with strong doping at high current densities. The choice of semiconductor material determines the emitted wavelength, whereby today a spectrum from infrared to ultraviolet is covered.

The light signal generated in this way is transmitted to the LiDAR light measurement system, which interprets it as an object at a distance corresponding to the delay time.

For each channel of the LiDAR light measurement system there is a signal chain independent of the other channels. This makes it possible to generate a simulated moving environment for the LiDAR system.

Generation of changeable time-delayed signals corresponding to a moving 1 to 3 dimensional scene, which are synchronously adapted to the scene at runtime.

Scalability in the channel Number of channels up to the resolution of the optical system used for distance measurement.

Scalability at a distance from a minimum distance which is limited by the reaction speed of the electronic components used to detect light pulses via the time delay elements up to light generation up to the maximum detection range of the optical system.

Especially for the use in the time-synchronous network of several different sensor simulators for the visualization of virtual realities.

Especially for the area of ADAS (Advanced driver assistance systems).

Adjustability of a static time delay which corresponds to a static distance.

An inventive simulation device has the advantage over the state of the art that not every type of sensor used has to be tested in its own simulation environment adapted for these sensors. Rather, a combination of the simulation patterns can ensure that all sensors used for vehicle monitoring, for example in the context of autonomous driving, can be tested as realistically as possible.

As a rule, radar sensors, camera sensors and LiDAR light receiving sensors are used in the context of vehicle monitoring.

Each type of sensor requires a simulation environment specifically adapted to the needs of the sensor, so that it is very time-consuming if each type of sensor has to be tested in the respective environment.

A combination of all above mentioned sensor types was not possible until now, because especially the LiDAR light receiving sensors could not be tested in a corresponding way. This is to be stopped with the present invention.

Ideally, a single computer should ensure all necessary steps for stimulation of the sensors in question in a cost-effective manner and also carry out the results of the sensors within the scope of target/actual comparisons.

The radar sensor is to be controlled or stimulated via a radar signal transmitter. The camera sensor is to be tested with a selection of lenses to determine whether, for example, autofocusing is performed in the desired manner at different distances.

Finally, the LiDAR light receiving sensor is to be tested by delaying a LiDAR light signal from a LiDAR light transmitter or by using an external light transmitter. A certain distance for the LiDAR light receiving sensor is simulated by either returning the recorded LiDAR light signal with a delay or sending a light signal after a certain period of time after activating the LiDAR light receiving sensor.

The computer carries out an initial target/actual comparison to check the radar sensor. The computer checks whether the radar signals sent by the radar signal transmitter also meet the requirements, i.e. the actual values, by the radar sensor.

The computer also carries out a second target/actual comparison to check the camera sensor. Here, the computer compares whether the camera sensor automatically focuses or focuses within a certain period of time, depending on the lens selected. The computer can also use a different lens, which simulates a further distance, for example, whereby the camera sensor must then automatically focus the test image again at a further distance in a certain time, depending on the specifications of the technical requirements.

A third target/actual comparison is also carried out to check the LiDAR light receiving sensor. Either the LiDAR light signal of the LiDAR light transmitter or the light signal of an autonomous light transmitter is used. The computer checks whether the time delay between the activation of the LiDAR light receiving sensor, the delayed transmission of the light signal and the receiving of the light signal by the LiDAR light receiving sensor corresponds to the values stored in the computer.

It is important in this context that the radar signal transmitter, the lens and the light transmitter synchronously control the radar sensor, the camera sensor and the light receiving sensor in a time window of less than 50 ms. The synchronous control allows a mutual control of the functionality of the radar sensor, the camera sensor and the light receiving sensor. The time window of 50 ms is the maximum permissible deviation to ensure mutual control of the components. In this way, the radar sensor can be tested, for example, as a function of the light receiving sensor. Or the light receiving sensor depending on the camera sensor. If, for example, the camera sensor sees something but the light receiving sensor does not, this is a malfunction which is indicated by the computer. If this is not the case, a faulty component is installed, which must be replaced.

BRIEF DESCRIPTION OF THE DRAWINGS

Further advantages, features and details of the invention result from the following description of preferred execution examples as well as from the drawings; these show in.

DETAILED DESCRIPTION

Figure 1:
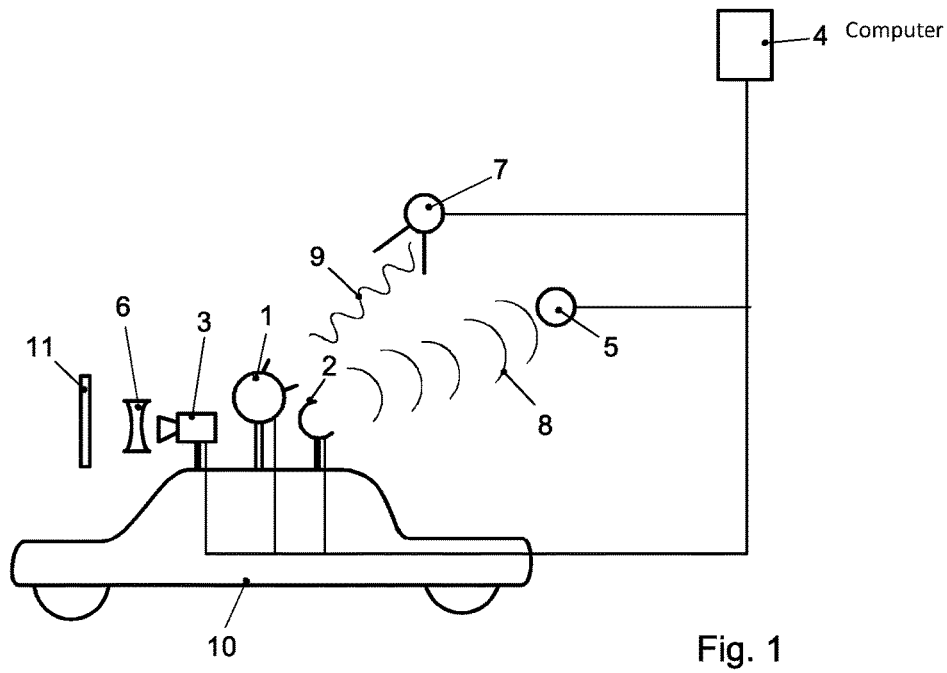
FIG. 1 a schematic view of a simulation device according to the invention

FIG. 1 shows a motor vehicle 10 which, for example, has a LiDAR light receiving sensor 1 for autonomous driving. A radar sensor 2 and a camera sensor 3 are also shown schematically.

The LiDAR light receiving sensor 1 is stimulated by a light transmitter 7. This can be done, for example, as described in FIG. 2. However, it is also conceivable that a LiDAR light transmitter 12, for example, is deactivated and an autonomous light transmitter 7 controlled by a computer 4 is activated. The computer 4 determines the time between the beginning of the reception readiness of the LiDAR light receiving sensor 1 and the emission of a light signal 9 by the light transmitter 7 in order to simulate a corresponding proximity or distance of a reflection.

The LiDAR light receiving sensor 1 is connected to the computer 4 via a data line or a radio line in the same way as the light transmitter 7. This connection transmits the data obtained by the LiDAR—not the receiving sensor 1—to computer 4.

FIG. 1 also shows a lens 6. The lens 6 should show the camera sensor 3 a test pattern 11 at a defined distance, whereby the test pattern 11 is always arranged at an actual distance which does not correspond to a distance defined closer, because the lens 6 gives the camera sensor 3 the impression that the test pattern, for example, is further away than is actually the case.

The camera sensor 3 and the lens 6 are also connected to computer 4 via the data line or radio line. The selection of the lens 6 is determined in particular by the computer. By selecting lens 6, computer 4 defines the distance to be checked, which is to be recorded by camera sensor 3 and also automatically displayed, for example. This automatic focusing can be simulated by selecting lens 6 at a distance of x-meters. If another lens is selected, a simulation for automatic focusing can be tested for x+10 meters, for example.

In addition, the radar sensor 2 is shown, which is to be stimulated by a radar signal transmitter 5. The radar signal generator 5 simulates a radar signal 8, which is perceived as an echo in the Doppler effect by the radar sensor 2.

The radar sensor 2 and the radar signal transmitter 5 are also connected to computer 4 via the data line or radio line and in this way transmit the data obtained, for example, by radar sensor 2 to computer 4. In such a case, computer 4 also determines whether and when radar signal transmitter 5 should transmit a radar signal 8.

Figure 2:
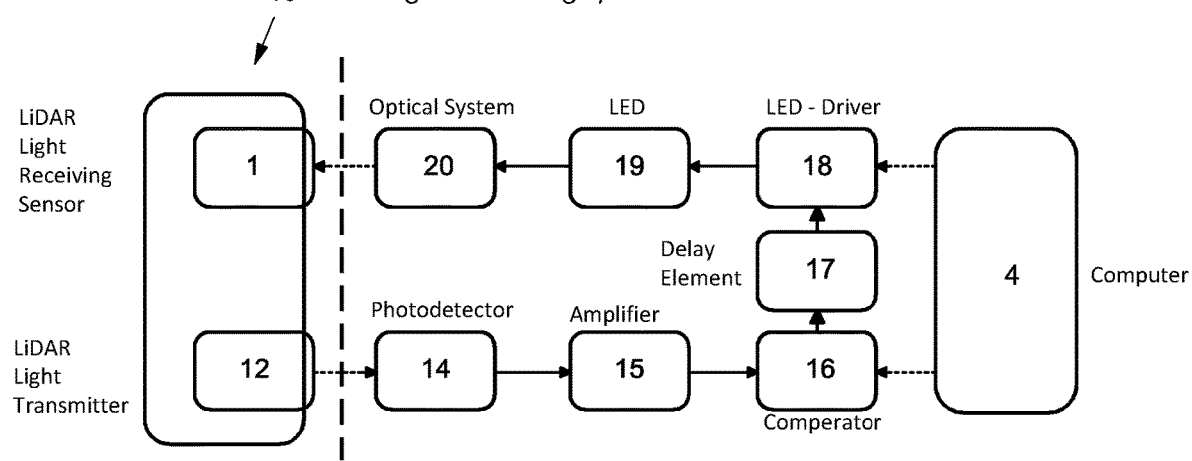
FIG. 2 shows a schematic circuit diagram.

FIG. 2 shows a schematic circuit diagram for the execution example, showing that not only a LiDAR light receiving sensor 1 of a LiDAR light measuring system 13 is used, but also a LiDAR light signal transmitter 12.

In such a case, the emitted LiDAR light signal from the LiDAR light signal transmitter 12 is first routed to a photodetector 14. Photodetector 14, for example, is an optical detector, optoelectronic sensor or other electronic component that converts light into an electrical signal using the photoelectric effect or shows an electrical resistance dependent on the incident radiation. However, the term also refers to applications that have integrated such a radiation-measuring component.

The signal picked up by the photodetector 14 is then transmitted to an amplifier 15, which upgrades the signal and amplifies it for further processing.

The signal is then passed on to a comparator 16. A computer 4 monitors the comperator 16 and the transmission of the signal to a delay element 17, which transmits the transmission of the signal to an LED driver 18 in a defined form and influenced by computer 4 with different time delays.

The LED driver 18 in turn causes an LED 19 (Light Emitting Diode) or a laser diode to emit the signal in an optical system 20 to light up. After the signal has been converted into a light signal by the LED 19 or the laser diode in the optical system 20, the LiDAR light receiving sensor 1 receives the light signal of the optical system 20.

In the inventive method of simulating a detection environment for the optical system, the computer controls the radar sensor 2 and the camera sensor 3 and the LiDAR light receiving sensor 1 on one side and the radar signal transmitter 5, the selection of the lens 6 and the light transmitter 7 on the other side.

Computer 4 performs an initial target/actual comparison to check radar sensor 2. Computer 4 checks whether the radar signals 8 sent by the radar signal transmitter 5 also meet the requirements, i.e. the actual values, by radar sensor 2.

Computer 4 also carries out a second target/actual comparison to check the camera sensor 3. Computer 4 compares whether the camera sensor 3 automatically focuses or focuses in a certain time depending on the selection of lens 6. The computer 4 can also use a different lens, which simulates a further distance, for example, whereby the camera sensor 3 then automatically has to focus the test image 11 again at a further distance in a certain time, depending on the specification of the technical requirements.

A third target/actual comparison is also carried out to check the LiDAR light receiving sensor 1. Either the LiDAR light signal of the LiDAR light transmitter 12 or the light signal of an autonomous light transmitter 7 is used for this purpose. Computer 4 checks whether the time delay between the activation of the LiDAR light receiving sensor 1, the delayed transmission of the light signal and the reception of the light signal by the LiDAR light receiving sensor 1 corresponds to the values stored in computer 4.

Figure 3:
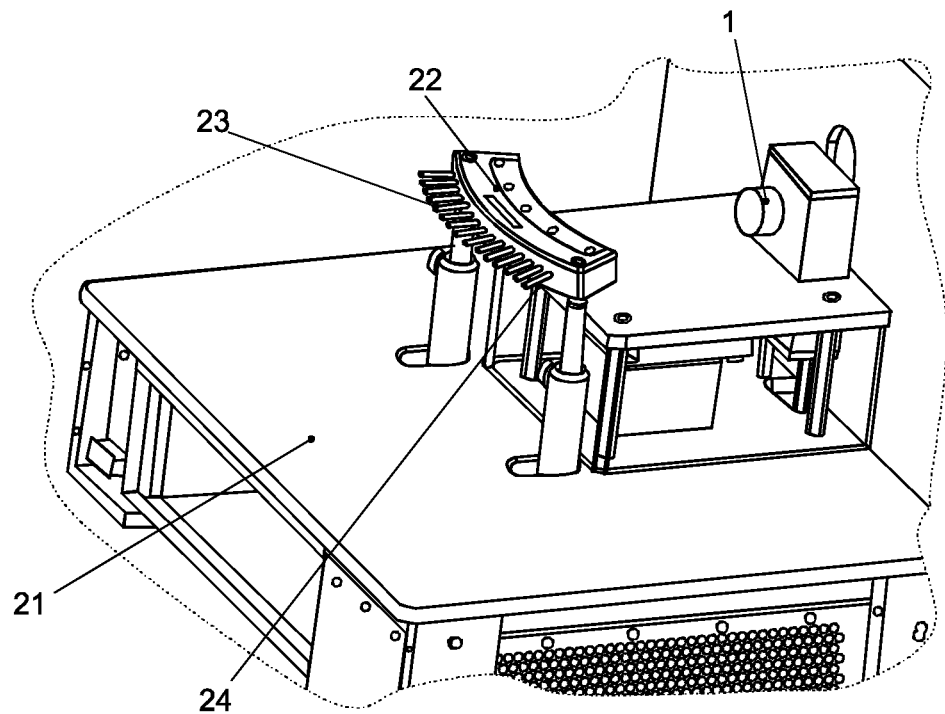
FIG. 3 an example of a part of FIG. 1.

FIG. 3 shows a part of FIG. 1 as part of an execution example. The LiDAR light receiving sensor 1 is held statically during the simulation. A simulation device is shown, which is arranged on a common underground 21. The LiDAR light receiving sensor 1 is arranged at a certain distance to the background 21. In addition a holder 22 is shown, which serves for the admission of several light transmitters 23, 24. In addition, a large number of other light transmitters can be mounted, which are shown in FIG. 3 but are not further named.

The light transmitter 23 and the other light transmitter 24 are held in the same plane by the holder. In this example, this means an equal distance to the background 20. They are arranged next to each other. This in turn means that the light transmitter 23 and the further light transmitter 24 are arranged in a graduated circle with centric alignment to the LiDAR light receiving sensor 1.

Figure 4:
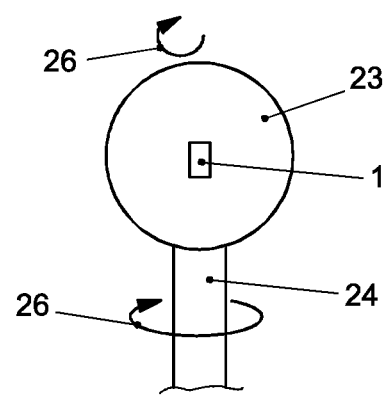
FIGS. 4-6 another example of execution.
Figure 5:
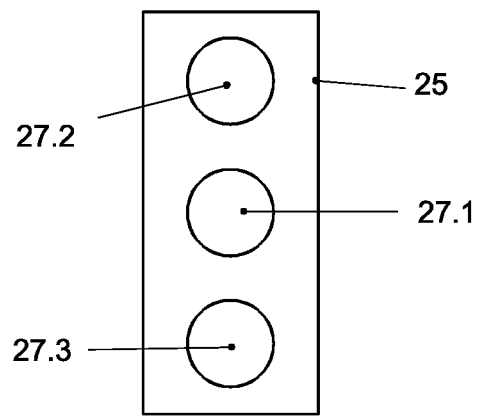
Figure 6:
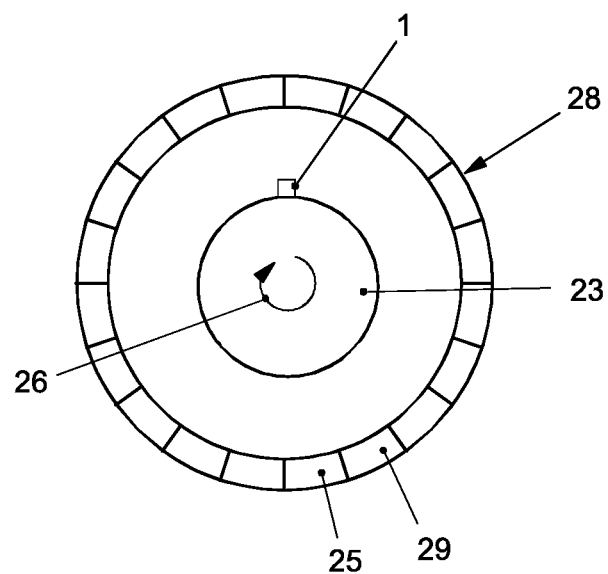

In FIGS. 4 to 6, a part of FIG. 1 is shown as part of another execution example. The LiDAR light receiving sensor 1 is rotated 360° during the simulation.

FIG. 4 shows a rotation head 23 in which the LiDAR light receiving sensor 1 is rotated. In addition an axis 24 is shown, on which the rotation head 23 rests.

In addition, the two rotation arrows 26 show the direction of rotation in this example.

FIG. 5 shows a light emitter strip 25. In the side of the light emitter bar 25 normally facing the rotation head 23, it is easy to see how a first light emitter 27.1 is arranged and how additional other first light emitters 27.2, 27.3 are arranged below and above the central first light emitter 27.1.

FIG. 6 shows a top view of a simulation device according to the invention. There the rotation head 23 is shown in the center of a light cylinder 28, which rotates in the direction of the rotation arrow 26.

The light guide cylinder 28 consists of the light emitter bar 25 and the further light emitter bar 29 and further light emitter bars not described but shown in FIG. 6, which together close the circle around the rotation head 23 in order to simulate a 360° environment.

Figure 8:
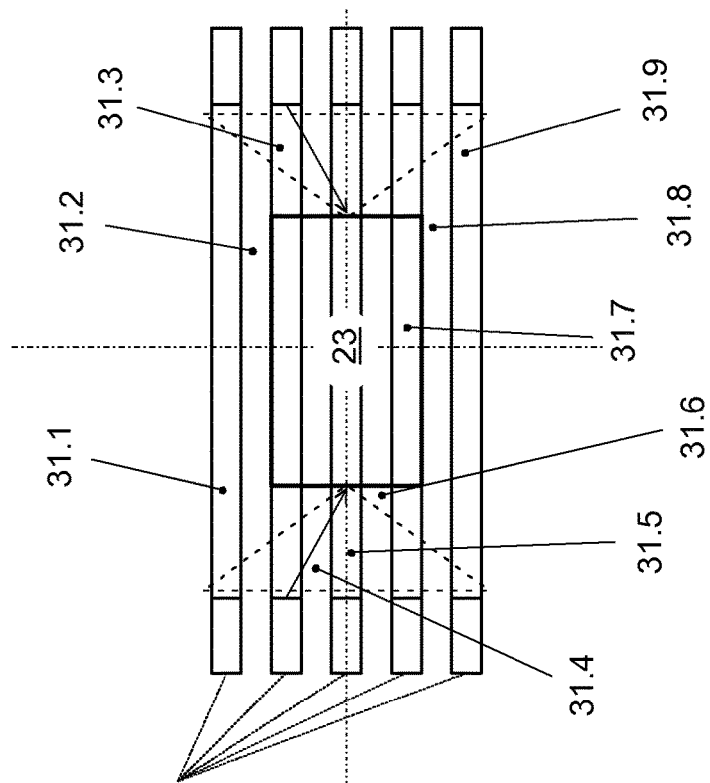
FIGS. 7 and 8 a third example of execution.
Figure 7:
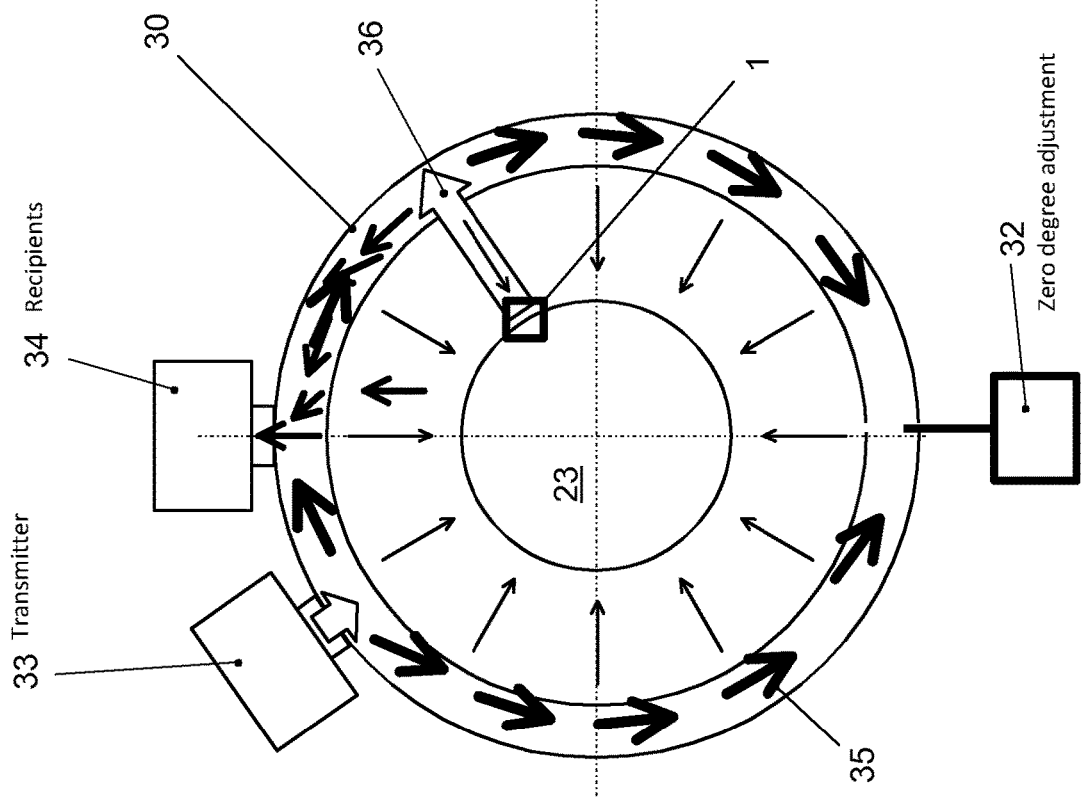

In FIGS. 7 and 8 a third axe is shown. FIG. 7 shows the view from above and FIG. 8 the cut side view. In the two figures the rotation head 23 is shown again, which is also rotated by 360°.

The rotation head 23 is surrounded by a light ring 30 in FIG. 7. The light ring 30 can be made of plastic in a 3D printing process. The light ring 30 consists of a multitude of superimposed rings 31.1-31.9, which are light-tightly shielded from each other.

FIG. 7 also shows a zero degree adjustment 32. When passing through the light receiving sensor 1 at zero degree adjustment 32, the computer is informed of the signal of passing through the zero degree adjustment 32, so that the exact position of the light receiving sensor 1 can always be determined on the basis of the rotational speed of the rotation head 23 and the time of passing through the zero degree adjustment 32. Consequently, the position of the light receiving sensor 1 can be determined as a function of the time elapsed since passing the zero degree adjustment 32 and the rotation speed. This is especially possible if a transmitter 33 emits a transmitter light here in the form of the transmitter light arrow 35, whereby the transmitter light propagates in the entire light ring 30 and is visible to the light receiving sensor 1. At the respective position of the light receiving sensor 1, a receiver return signal 36 is again transmitted, which is detected by a receiver 34.

In this way a detection of the position and the functionality of the light receiving sensor 1 can be determined.

Although only one or more preferred examples of the invention have been described and presented, it is obvious that the expert can add numerous modifications without leaving the essence and scope of the invention.

REFERENCE CHARACTER LIST

1—LiDAR light receiving sensor
2—Radar sensor
3—Camera sensor
4—computers
5—Radar signal transmitter
6—Lens
7—Light transmitter
8—Radar signal
9—Light signal
10—Motor vehicle
11—Test pattern
12—LiDAR—Light transmitter
13—LiDAR—Light measuring system
14—Photodetector
15—Amplifier
16—Comperator
17—Delay element
18—LED—Driver
19—LED
20—Optical system
21—Substrate
22—Mounting
23—Rotary head
24—Axle
25—Light emitter strip
26—Rotation arrow
27—Light transmitter
28—Light guide cylinder
29—Further light emitter strip
30—Light ring
31—Ring
32—Zero degree adjustment
33—transmitter
34—Recipients
35—Transmitter light arrow
36—Receiver return signal

The invention claimed is:

1. Simulation device for motor vehicle monitoring, comprising:
a radar sensor (2), a camera sensor (3), a LiDAR light receiving sensor (1) and a computer (4), the radar sensor (2), the camera sensor (3) and the LiDAR light receiving sensor (1) being connected to the computer (4),
wherein
the radar sensor (2) is controlled via a radar signal transmitter, the camera sensor (3) is controlled via a lens, and the LiDAR light receiving sensor (1) is controlled via a light transmitter (7, 12, 27.1, 27.2, 27.3), wherein the radar signal transmitter, the lens and the light transmitter (7, 12, 27.1, 27.2, 27.3) synchronously control the radar sensor (2), the camera sensor (3) and the light receiving sensor (1) in a time window of less than 50 ms.

2. Simulation device according to claim 1, wherein the radar sensor (2), the camera sensor (3) and the LiDAR light receiving sensor (1) are connected to the computer (4) by a data line or a radio line.

3. Simulation device according to claim 2, wherein the radar signal transmitter (5), the lens (6) and the light transmitter (7, 12, 27.1, 27.2, 27.3) are connected to the computer (4).

4. Simulation device according to claim 1, wherein the radar signal transmitter (5) is activated by the computer (4), the computer (4) being configured to carry out a first setpoint/actual comparison of the reception of the radar sensor (2).

5. Simulation device according to claim 1, wherein the lens (6) is brought into operative connection with the camera sensor (3), the computer (4) carrying out a second setpoint/actual comparison of the focusing of the camera sensor (3).

6. Simulation device according to claim 1, wherein the light transmitter (7, 12, 27.1, 27.2, 27.3) is activated by the computer (4), the computer (4) being configured to carry out a third setpoint/actual comparison of the reception of the LiDAR light receiving sensor (1).

7. Method for simulating a detection environment for a radar sensor (2), a camera sensor (3), a LiDAR light receiving sensor (1), and a light transmitter (7, 12, 27.1, 27.2, 27.3) all connected to a computer (4), comprising the following steps:
driving the radar sensor (2) by a radar signal (8) of a radar signal transmitter (5);
monitoring, with the computer (4), the radar signal transmitter (5) and the radar sensor (2);
carrying out, with the computer (4), a first setpoint/actual comparison;
controlling the camera sensor (3) with a lens (6);
monitoring, with the computer (4), the lens (6) and the camera sensor (3);
carrying out, with the computer (4), a second setpoint/actual comparison;
activating the LiDAR light receiving sensor (1) with a light signal from the light transmitter (7, 12, 27.1, 27.2, 27.3);
registering the light signal (9) at the LiDAR light receiving sensor (1); and
carrying out, with the computer (4), a third setpoint/actual adjustment, whereby
the radar signal transmitter, the lens and the light transmitter (7, 12, 27.1, 27.2, 27.3) synchronously control the radar sensor (2), the camera sensor (3) and the light receiving sensor (1) in a time window of less than 50 ms.

* * * * *